Aug. 4, 1959     W. A. BISHMAN     2,897,881
BEAD SEATING TOOL FOR TUBELESS TIRES
Filed April 25, 1955
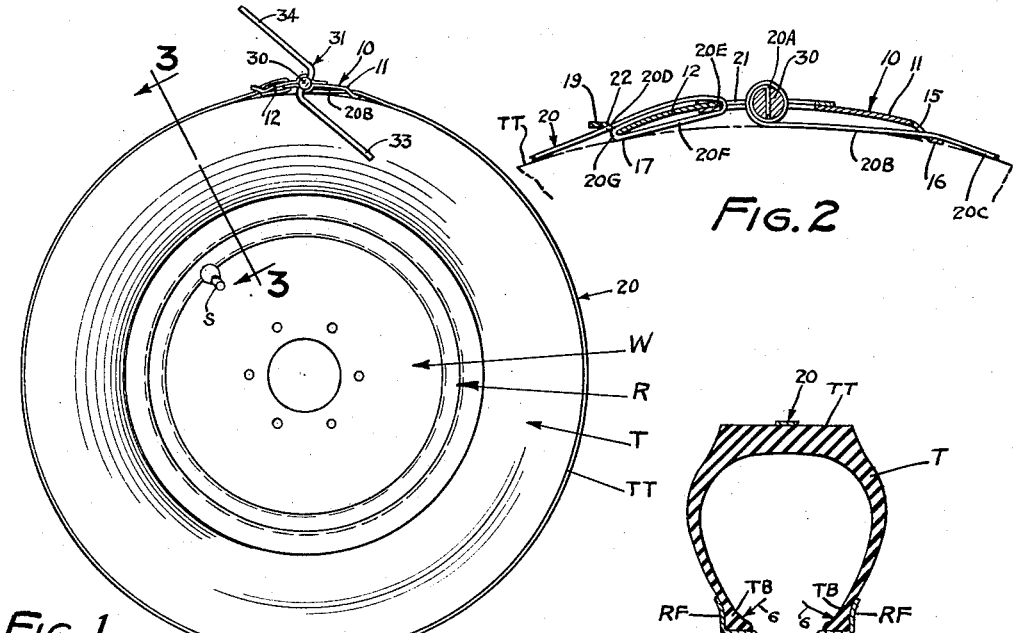
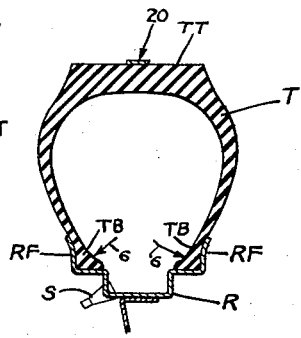
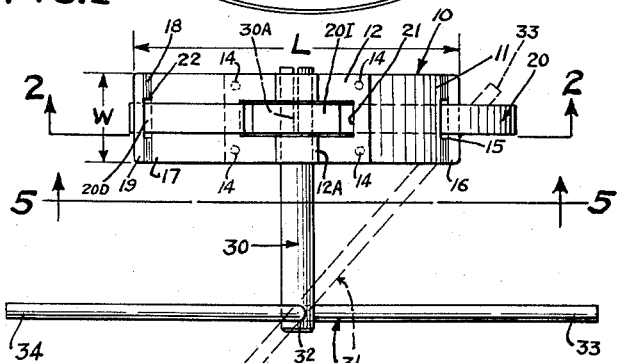
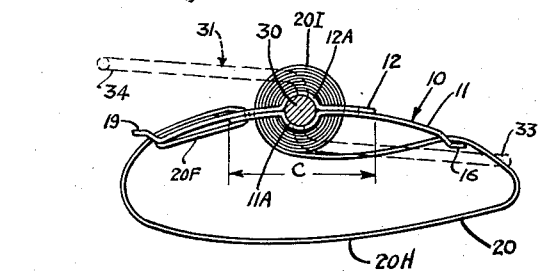
INVENTOR.
WALTER A. BISHMAN
BY
ATTORNEYS

# United States Patent Office 2,897,881
Patented Aug. 4, 1959

2,897,881

BEAD SEATING TOOL FOR TUBELESS TIRES

Walter August Bishman, Minneapolis, Minn., assignor to Bishman Manufacturing Company, Osseo, Minn., a corporation of Minnesota Application April 25, 1955, Serial No. 503,651

3 Claims. (Cl. 157—1.21)

This invention relates to tools for use in mounting and inflating tubeless tires.

One difficulty is encountered in connection with the use of the tubeless tire, namely the difficulty of making the tire-rim assembly intially tight for inflation. It will be appreciated that the air-containing torus is actually composed of two widely different elements, namely, (1) the steel rim, and (2) the reinforced rubber casing. These fit together at the two tire bead-rim flange contacting surfaces to make up the air holding assembly. In tubeless tires there are frequently provided soft sealing strips running along that part of the beads which lies against the rim flanges and this effects a good pneumatic seal provided the beads are pushed against the rim flanges. The air under pressure in the inflated tire will provide the necessary push to effect seal once inflation is effected, but some push of the tire beads toward the flange is initially needed to effect a preliminary closure of the tire-rim assembly, so that air will be held.

It is to the solution of this problem of facilitating the initial inflation that this invention is directed.

More particularly, it is an object of this invention to provide an instrumentality by which the beads of a tubeless tire may be deflected intially so as to force the tire beads away from each other and into contact with the flanges of the rim for effecting initial sealing of the beads to the rim flanges preparatory to inflation.

It is a further object of the invention to provide a portable and light weight mechanism by which tubeless tires may be manipulated for rendering the tire bead rim flange connections sufficiently air-tight to allow inflation under pressure.

It is another object of the invention to provide a very portable tire tool for use in inflating tires, the tool being of sufficiently inexpensive construction so as to permit it to be given away as a premium with sets of tires with which it is intended to be used or at least sufficiently inexpensive so as to permit sale of the device at a very nominal price to automobile owners.

It is another object of the invention to provide a tool which can be expanded in use to a size sufficiently large that it will engage the tire tread like a hoop for contracting it, and yet be capable of being reduced in size to such an extent that it requires only nominal space for storage or transportation.

It is also an object of the invention to provide a hoop for circumferentially contracting a tire and so constructed that it can be spirally coiled to minimum size during storage.

Other objects of the invention are those inherent in the apparatus herein illustrated, described and claimed.

The invention is illustrated with reference to the drawings in which corresponding numerals refer to corresponding parts and in which:

Figure 1 is a side view of a tubeless tire-wheel and rim assembly showing the portable tire tool of the present invention in place on the tread of the tire as it appears when the tire is about to be inflated;

Figure 2 is an enlarged fragmentary sectional view thru the winding mechanism and frame plate at a position corresponding to section line 2—2 of Figure 4. However, Figure 2 shows the device as it appears in use whereas Figure 4 shows it when the tire tool is wound up to the Figure 5 size, for carrying it;

Figure 3 is a transverse sectional view thru the tire and rim, showing the tire contraction hoop thereon and in section;

Figure 4 is a plan view of the tire tool of the present invention, showing it with the hoop wound up as in the carrying or storage condition;

Figure 5 is a sectional view taken along the line and in the direction of arrows 5—5 of Figure 4.

Referring to the drawings at W there is shown a wheel of an automotive or the like vehicle. The wheel is provided with a rim R which as herein illustrated is positively fastened in place on the wheel but can be made demountable. The tubeless tire T is seated in place on the rim and is held with the tire beads TB—TB seated against the rim flanges RF—RF. In the tubeless tire the tire inflating stem S is in the rim itself. Once in place on the rim and inflated the air pressure forces outwardly on the bead as at 6—6, Figure 3. The problem to be solved involves making the contact between the beads TB and the rim R and rim flanges RF sufficiently tight initially to permit inflation. Once inflation can be initiated even slightly the air pressure will keep the bead-rim flange junctions tight.

The tool comprises generally a hoop 20, which can be placed on the tire tread so as to encircle the tread, and a frame 10 and winder 30 by means of which the hoop 20 can be tightened in use and by means of which the hoop 20 can be wound to small size for storage and carrying.

The frame 10 may be constructed in a variety of ways. In the exemplary form shown it is composed of two overlapping parts 11 and 12 which overlap to form a stiffened center portion C. Each of the plates 11 and 12 has a central rectangular opening at 21 and these are aligned when the parts 11 and 12 are overlapped and the two pieces 11 and 12 are then attached firmly together as by rivets or spotwelds at 14—14. The two pieces 11 and 12 are each formed with a semicircular bend, which is upward at 12A for plate 12 and downward at 11A for plate 11. When brought together as shown in the drawings the two bends together form aligned bearing apertures on each side of slot 21 and it is thru these apertures that the winding shaft 30 is placed.

Shaft 30 is slotted far enough back at 30A so that when shaft 30 is in place, the sharply bent-over end 20A of the hoop band can be run thru the slot 30A for attachment. The hoop 20 is always wound at least a few turns as at Figure 2, and hence is tightly held in place.

The hoop band 20 is preferably made of flat steel "banding" strip material which is a stock steel item, inexpensive and very strong. The strip 20, after making a few turns around the winding shaft 30, Figure 2, extends circumferentially along the tread TT of the tire as at 20B and then passes out thru a small slot 15 in plate 11. The plate 11 is bent down at 16 to form a foot, and slot 15 is made at this bend. The band 20 then continues at 20C in contact with the tire tread, all the way around the circumference of the tire and then is attached to the opposite end of frame 10, i.e., to plate 12. Plate 12 is curved so as to extend down towards the tire at 17, then bends sharply outward at 18 and has a flat lip at 19. A slot 22, similar to slot 15, is cut in the bend 18. For purposes of attachment, the return end of band 20 is run thru the slot at 20D, and then continues and extends around at 20E, thru one end of slot 21 and then follows back at 20F and again enters at 20G into the slot 22 where it stops at a position under the incoming part of the band 20. The result of this wrap is a very convenient and inexpensive mode of attachment of the hoop plate 12 of frame member 10.

The curvature of member 10 is such that when portions 16 and 17 are resting on the tire tread, enough space will be left under the member 10 so that hoop 20 runs out tangentially just about on the surface of the tread, after making several turns around the shaft 30, as in Figure 2. This, of course, is the position when the device is used with the largest size of tire with which it can be used. When the same device is used on a smaller size of tire more of hoop 20 will be wound on stem 30 and this will lift portions 16 or 17 (or both) from the tread as the diameter of the wound-up part of band 20 increases.

For rotating the stem or shaft 30 there is provided a simple handle 31 which passes thru hole 32 in the outer end of shaft 30. The handle 31 is of round rod and it is bent so as to provide two ends 33 and 34, thus a "double end" handle.

The handle may be oscillated to some extent in its hole in shaft 30 to permit the ends 33—34 to be moved to the dotted position of Figures 4 and 5. The reason for this is as follows: When the device is not in use it is wound to the position of Figure 5, thus pulling in all of the hoop 20 to leave nothing but a very small loop, 20H. With the hoop thus reduced in size, and with almost all of the hoop band neatly wound up as at 20–I, Figure 5, the device can very conveniently be stored, as in the tool compartment of an automobile, or conveniently carried. To hold shaft 30 against unwinding, the handle 31 is merely rotated slightly to the dotted position (Figures 4 and 5) until one of the ends (33 or 34) is caught in the loop 20H, where it will be held.

The shaft 30 is made long enough so that the handle 31 will clear the tire sidewall when the hoop 20 is aligned with the center of the tread as in Figure 3.

In use the hoop 20 is unwound so as to have a sufficient circumference to reach around the tire which is about to be inflated. The hoop 20 is then aligned with approximately the center line of the tire tread TT, as in Figure 3 and the handle 31 is turned so as to rotate shaft 30 and wind in the hoop. When this occurs the hoop is tightened onto the tire and as increasing hoop tension is imposed on the tire, resultant forces will deflect the tire structure and bring the tire beads TB—TB tightly into contact with the rim R and rim flanges RF—RF. While the hoop is thus maintained tight, air is introduced thru stem S and the air pressure will thereafter maintain the tire beads tightly against the flanges. The handle 31 is then rotated in a direction to unwind the band 20, and when it is loosened it can be removed.

As many variations in mode of construction of the apparatus herein illustrated and described will suggest themselves to those skilled in the art, the invention is not limited except as defined in the appended claims.

What I claim is:

1. A tool for deflecting the beads of a tubeless tire after it has been mounted on a rim and preparatorily to inflating the tire comprising a frame moderately bent so as to fit approximately the curvature of the tire with which it is used, said frame being of such size that it subtends an arc of the tire tread circumference of the tire, said frame being made up of two generally flat elongated bars bent so as to provide journal surfaces therebetween when the bars are secured together in at least a partial overlapping relationship, said journal surfaces supporting a winding shaft crosswise on the frame when it is placed on a tire, a winding shaft journaled in said journaled surfaces, a thin flexible strand having one end attached to one end of the frame so as to extend in a direction normal to said shaft, said strand being formed as a loop and having its other end extend along the other end of the frame and attached to the winding shaft for winding on the shaft in the manner of a clock spring and a crank on the shaft for turning said shaft.

2. The tool of claim 1 further characterized in that said crank is pivotally attached to the cross shaft for rotations relative thereto about an axis normal to the shaft axis and having bent end portions whereby the crank may be moved and retained in a locked position.

3. The tool of claim 1 further characterized in that an opening is provided in the end portion of the frame at the end opposite the one to which the flexible strand is attached through which said strand is passed and that said end portion is bent reversely with respect to the general curvature of the rest of the frame.

References Cited in the file of this patent

UNITED STATES PATENTS

| | | |
|---|---|---|
| 949,083 | Mossberg | Feb. 15, 1910 |
| 1,200,706 | Brost | Oct. 10, 1916 |
| 1,414,014 | Genett | Apr. 25, 1922 |
| 1,966,580 | Bull | July 17, 1934 |
| 1,978,646 | Oishei et al. | Oct. 30, 1934 |
| 2,058,949 | Borowski | Oct. 27, 1936 |
| 2,684,112 | Coats | July 20, 1954 |
| 2,778,415 | Murray | Jan. 22, 1957 |
| 2,791,270 | Hildebrant | May 7, 1957 |